United States Patent
Berthelsen et al.

(10) Patent No.: US 7,926,646 B1
(45) Date of Patent: Apr. 19, 2011

(54) DOUBLE-SEALED, BEARINGLESS, RECIPROCATING CONVEYOR WITH SLAT-SUPPORTING GUIDE TROUGH SUBDECKS

(75) Inventors: Timothy M. Berthelsen, Tillamook, OR (US); Brady L. Byers, Tillamook, OR (US); Gregory P. Danis, Tillamook, OR (US)

(73) Assignee: Hallco Industries, Inc., Tillamook, OR (US)

( * ) Notice: Subject to any disclaimer, the term of this patent is extended or adjusted under 35 U.S.C. 154(b) by 96 days.

(21) Appl. No.: 12/332,335

(22) Filed: Dec. 10, 2008

(51) Int. Cl.
*B65G 25/04* (2006.01)

(52) U.S. Cl. .............. 198/750.3; 198/750.4; 198/750.5

(58) Field of Classification Search .... 198/750.2–750.6; 414/525.9
See application file for complete search history.

(56) References Cited

U.S. PATENT DOCUMENTS

| | | | |
|---|---|---|---|
| 3,534,875 A | 10/1970 | Hallstrom | |
| 4,143,760 A | 3/1979 | Hallstrom | |
| 4,144,963 A | 3/1979 | Hallstrom | |
| 4,184,587 A | 1/1980 | Hallstrom | |
| 4,611,708 A | 9/1986 | Foster | |
| 4,691,819 A | 9/1987 | Hallstrom | |
| 4,727,978 A | 3/1988 | Hallstrom | |
| 4,856,645 A | 8/1989 | Hallstrom | |
| 4,966,275 A | 10/1990 | Hallstrom | |
| 5,088,595 A | 2/1992 | Hallstrom | |
| 5,165,525 A | 11/1992 | Quaeck | |
| 5,228,555 A | 7/1993 | Hallstrom | |
| 5,263,573 A | 11/1993 | Hallstrom | |
| 5,267,641 A | 12/1993 | Hallstrom | |
| 5,301,798 A | 4/1994 | Wilkens | |
| 5,325,957 A | 7/1994 | Wilkens | |
| 5,335,778 A | 8/1994 | Wilkens | |
| 5,447,222 A | 9/1995 | Foster | |
| 5,540,322 A * | 7/1996 | Foster | 198/750.3 |
| 5,547,067 A | 8/1996 | Foster | |
| 5,560,472 A | 10/1996 | Gist | |
| 5,664,663 A | 9/1997 | Wilkens | |
| 5,727,672 A | 3/1998 | Foster | |
| 5,806,660 A | 9/1998 | Foster | |
| 6,257,396 B1 | 7/2001 | Quaeck | |
| 6,513,648 B1 | 2/2003 | Hallstrom et al. | |
| 6,651,806 B2 | 11/2003 | Hallstrom | |

(Continued)

FOREIGN PATENT DOCUMENTS

DE 3731612 A1 * 4/1989

OTHER PUBLICATIONS

Hallco MFG. Company, Inc., "Hallco Live Floor NLR Deck Connfiguraations," at least as early as 2004, 1 page.

*Primary Examiner* — Mark A Deuble
(74) *Attorney, Agent, or Firm* — Law Office of Karen Dana Oster, LLC (57) ABSTRACT

A reciprocating slat conveyor includes a plurality of laterally and substantially parallel longitudinal trough-like subdecks and a plurality of longitudinal slats adjacent to and parallel to each other. The slats are in a sliding relationship with a pair of adjacent subdecks and cover the longitudinal space between the pair of adjacent subdecks. The subdecks longitudinally support two adjacent slats at or near a slat longitudinal side edge. The subdecks conduct the movement of the slats, preferably without distinct bearing elements therebetween. Some preferred embodiments include raised double-seal system.

26 Claims, 7 Drawing Sheets

U.S. PATENT DOCUMENTS

| | | |
|---|---|---|
| 6,763,933 B1 | 7/2004 | Wilkens et al. |
| 7,152,729 B2 | 12/2006 | Wilkens et al. |
| 7,461,738 B1 | 12/2008 | Delamarter et al. |
| 7,510,072 B1 * | 3/2009 | Wilkens .................... 198/750.3 |
| 2007/0199802 A1 * | 8/2007 | Meyer et al. ............... 198/750.3 |
| 2008/0277246 A1 | 11/2008 | Berthelsen |
| 2010/0025193 A1 | 2/2010 | Delamarter et al. |

\* cited by examiner

DOUBLE-SEALED, BEARINGLESS, RECIPROCATING CONVEYOR WITH SLAT-SUPPORTING GUIDE TROUGH SUBDECKS

BACKGROUND OF INVENTION

This invention relates to reciprocating slat-type conveyors, and more particularly to a double-sealed, bearingless, reciprocating slat-type conveyor in which the longitudinal edges of the slats are supported by guide trough subdecks.

Reciprocating slat-type conveyors (also referred to as "conveyor systems," "live floor conveyors," "reciprocating slat conveyors," or "conveyors") generally include a plurality of elongated slats (also referred to as "conveyor slats," "floor slats," or "deck slats"). The conveyors are generally used in the load-holding compartment of load transport vehicles (e.g. a mobile cargo trailer, bed of a truck (truck bed), rear portion of a semi-trailer, or container portion of a van-truck). The slats are arranged side-by-side to form the floor of the load-holding compartment so that they extend longitudinally to the framework of the load-holding compartment. A "load" may be, for example, grain, fertilizer, soil, sand, shredded documents, chipped wood, sawdust, garbage, or any particulate matter.

The slats are generally grouped such that one group of slats (a group generally includes at least three slats although it is to be understood that each group may include any desired number in excess of two) moves simultaneously in one direction (the "load-conveying direction") and then returns one slat at a time (in the "retraction direction") to the beginning position. This operation results in a step-wise advance of the load positioned on the floor followed by a retraction of the slats without moving the load.

Early live floor conveyors used essentially flat reciprocating slats, such as those described in U.S. Pat. Nos. 3,534,875 and 4,143,760 (which are herein incorporated-by-reference in their entirety). These flat slats rested directly on transverse frame beams and guide beams. This configuration proved problematic because friction between the slats and the beams resulted in great amounts of power lost to friction and the slats not moving smoothly on the beams. This was particularly true when the slats became wet and/or worn.

To alleviate these problems, the industry began using anti-friction bearings between the slats and the beams. This is shown in the pervasive use of bearings in live floor conveyors including, but not limited to those shown in U.S. Pat. Nos. 4,144,963, 4,184,587, 4,611,708, 4,856,645, 5,088,595, 5,165,525, 5,263,573, 5,267,641, 5,301,798, 5,325,957, 5,335,778, 5,547,067, 5,560,472, 5,664,663, 5,727,672, 6,257,396, 6,513,648, 6,651,806, 6,763,933, and 7,152,729 and in U.S. Publication No. 2008/0277246. These references are herein incorporated-by-reference in their entirety. Many of the bearings have a structure similar to that shown in U.S. Pat. No. 4,144,963 (which is herein incorporated-by-reference in its entirety) that describes a plurality of anti-friction bearings made of synthetic thermoplastic resin such as Teflon®, Delrin®, polyethylene, etc., or other suitable material having a low coefficient of friction. Each bearing is substantially U-shape in cross-section, having a top wall and laterally-resilient side walls to overlap the top and sides of a guide beam. Each of the side walls is provided with a pair of downwardly and inwardly extending legs such that, when in position, the legs are positioned inwardly under the opposite sides of the guide beam to secure the bearing against vertical and longitudinal displacement. Bearings, however, can be problematic for many reasons including, but not limited to that they can slip or become worn, they require a large amount of labor to install, they require relatively close tolerances for fitting between the subdeck and slats, they allow road debris such as dust and salt to become entrapped between the deck and the bearing thus increasing wear of the slats, they add weight, and they are expensive to replace.

Live floor conveyors are often used to convey particulate matter. Sometimes it is undesirable to allow the particulate matter to escape the live floor conveyor. For example, shredded confidential paper can not be allowed to escape for legal reasons. Other types of loads such as feeds and fertilizers should not be allowed to filter through the conveyors and onto the ground while the system is in the operating mode. The filtering of chicken feed, for example, to the ground attracts wild birds which in turn can bring disease to flocks of young chickens and other fowl. U.S. Pat. No. 4,727,978 (which is herein incorporated-by-reference in its entirety) is a reciprocating conveyor formed of at least one group of slats of inverted U-shape that are spaced apart laterally. The downward side sections of adjacent slats are positioned within an elongated trough into which the particulate matter is deposited. It should be noted that because the troughs do not support or guide the slats, additional structures such as tubular support members and bearing members must be used.

U.S. Pat. No. 4,611,708 (which is herein incorporated-by-reference in its entirety) is directed to a system that has floor members (slats) that are supported on guide beams with bearing means between the floor members and the guide beams. Channels are formed between the guide beams. Matter such as refrigerated air, small particles of ice, water, and garbage are allowed to enter into the channel space. One problem with this conveyor is that large particles can collect in the channel and remain in the channel after the load has been unloaded. When the particles are confidential documents this problem is not tolerable. When various cargos are being hauled with the same conveyor it is undesirable to mix the cargos. Mixing would occur with this open channel floor. Another problem is that the position of the slat on the guide beam is not very stable. The wide slat is supported only along the length of its center and, therefore, any heavy object sitting offset on the slat can cause the slat to tip on its side and cause uneven wear.

U.S. Pat. No. 5,727,672 (which is herein incorporated-by-reference in its entirety) is directed to a system that uses four primary components: pultruded conveyor slats, bearings, guide members, and support members. The slats have downwardly directed lower sections that grip the guide members. The slats also have wing portions that are supported by the bearings that are, in turn, supported by the support members. The bearings also act as a seal to prevent particulate matter from escaping. If, however, particulate matter gets past the bearing seal, it will escape the conveyor system. Since the pathway for material to escape has a horizontal portion and a downward portion it is natural for material to leak. In other words, there is little resistance to leakage except for the weight of the load on the slat on the seal. Also, there is little to prevent material from entering the sliding contact area between the bearing and the slat. When particles enter this joint they reduce the effectiveness of the bearing and cause premature wear.

U.S. Pat. No. 6,257,396 (which is herein incorporated-by-reference in its entirety) is directed to a system that uses three primary components: slats, bearing strips (having a longitudinal groove on the top surface thereof), and longitudinal beams. The longitudinal beams are shaped like channels. The bearing strips are supported on the longitudinal beams, but completely enclose the interior of the channels. The slats are longitudinally supported on two adjacent bearing strips and longitudinal beams. This reference states that particulate matter that filters between the edges of the adjoining slats falls into the grooves in the bearing strips and is cleared away during the conveying process and/or routine maintenance. If, however, particulate matter gets past the bearing strip, it will escape the conveyor system. In addition, the pathway for material to escape the cargo area and enter the contact area between the slat and the bearing is down and horizontal. There is little resistance to prevent material from entering the sliding contact area and thereby cause greater resistance to the sliding motion. Finally, the slat must have a stiff cross-section to resist buckling since the joint between the subdeck and the deck is very loose.

U.S. Pat. No. 6,513,648 (which is herein incorporated-by-reference in its entirety) is directed to a system that uses three primary components: elongated subdeck sections (which are joined together by liquid-tight seals) with upwardly projecting bearing supports, elongated bearings that wrap around the upwardly projecting bearing supports, and deck slats. If this system is functioning properly, it can be extremely effective and even liquid tight. However, if the seals fail or are not installed properly, there may be at least some places where particulate matter can escape from the conveyor system. In addition, the pathway for material to escape the cargo area and enter the contact area between the slat and the bearing is down and horizontal. There is little resistance to prevent material from entering the sliding contact area and thereby cause greater resistance to the sliding motion. The increased friction also occasionally causes the bearing to slide off the bearing posts.

BRIEF SUMMARY OF THE INVENTION

This invention relates to reciprocating slat-type conveyor, and more particularly to a double-sealed, bearingless, reciprocating slat-type conveyor in which the longitudinal edges of the slats are supported by guide trough subdecks.

In one preferred embodiment, a reciprocating slat conveyor of the present invention includes a plurality of laterally and substantially parallel longitudinal trough-like subdecks and a plurality of longitudinal slats adjacent to and parallel to each other. Each slat has a slat top surface, a slat bottom surface, a slat first longitudinal side edge, and a slat second longitudinal side edge. Each slat centrally located within the load-holding compartment is in a sliding relationship with a pair of adjacent subdecks and covers the longitudinal space between the pair of adjacent subdecks, the pair of adjacent subdecks conducting the movement of the slat. Each subdeck centrally located within the load-holding compartment longitudinally supports two adjacent slats at or near a slat longitudinal side edge.

The subdecks are preferably in a spaced relationship so as to form a longitudinal space between adjacent subdecks. In some preferred embodiments, drive mechanisms are positioned in the longitudinal spaces between adjacent subdecks.

In some preferred embodiments, the subdecks are made of a first material and the slats are made of a second material dissimilar to the first material. In some preferred embodiments the first material is stiffer than the second material.

In some preferred embodiments, the reciprocating slat conveyor is free from distinct bearing elements between the subdecks and the slats.

In some preferred embodiments, first seals are formed when the slat first longitudinal side edge of one slat is in sliding relationship with the slat second longitudinal side edge of an adjacent slat. In some preferred embodiments, the slat first longitudinal side edge of one slat overlaps with the slat second longitudinal side edge of an adjacent slat.

In some preferred embodiments, second seals are formed when upward side projections and/or slat engagers of the subdeck are substantially coextensive and in sliding relationship with the slat surfaces (e.g. the slat bottom surface or legs extending downwardly from the slat).

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, which are incorporated in and constitute a part of this specification, illustrate various exemplary embodiments.

DETAILED DESCRIPTION OF THE INVENTION

Before describing the double-sealed, bearingless, reciprocating conveyor with slat-supporting guide trough subdecks of the present invention, some of the basic concepts of a reciprocating conveyor are discussed. Please note that the terms and phrases may have additional definitions and/or examples throughout the specification. Where otherwise not specifically defined, words and phrases are given their ordinary meaning in the art. Exemplary embodiments may be better understood with reference to the drawings, but these embodiments are not intended to be of a limiting nature. The same reference numbers will be used throughout the drawings and description in this document to refer to the same or like parts.

Figure 1:
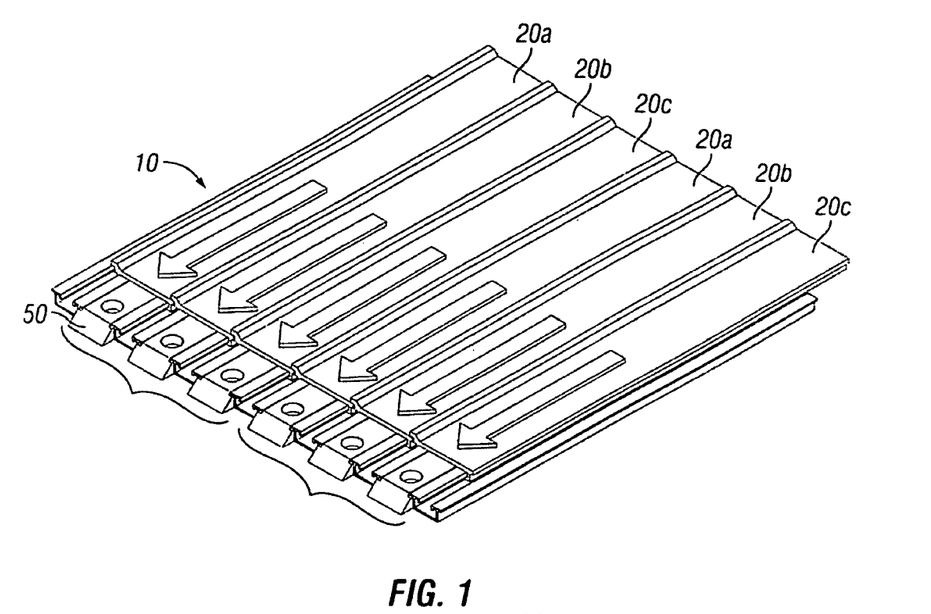
FIG. 1 is a perspective view of a plurality of deck slats moving simultaneously in a "load-conveying direction."
Figure 2:
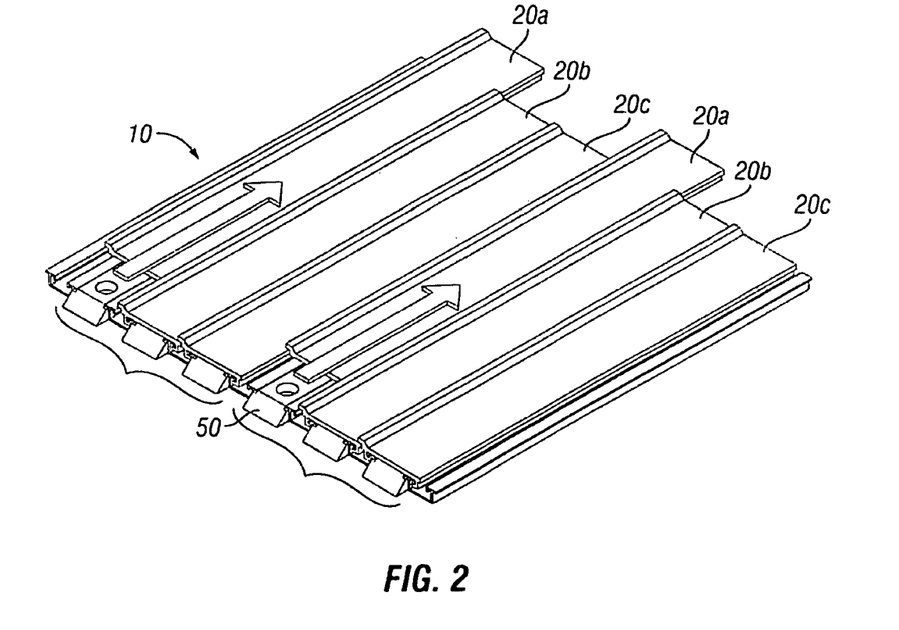
FIG. 2 is a perspective view of a plurality of deck slats, one slat from each group moving in a "retraction direction" opposite the "load-conveying direction."
Figure 3:
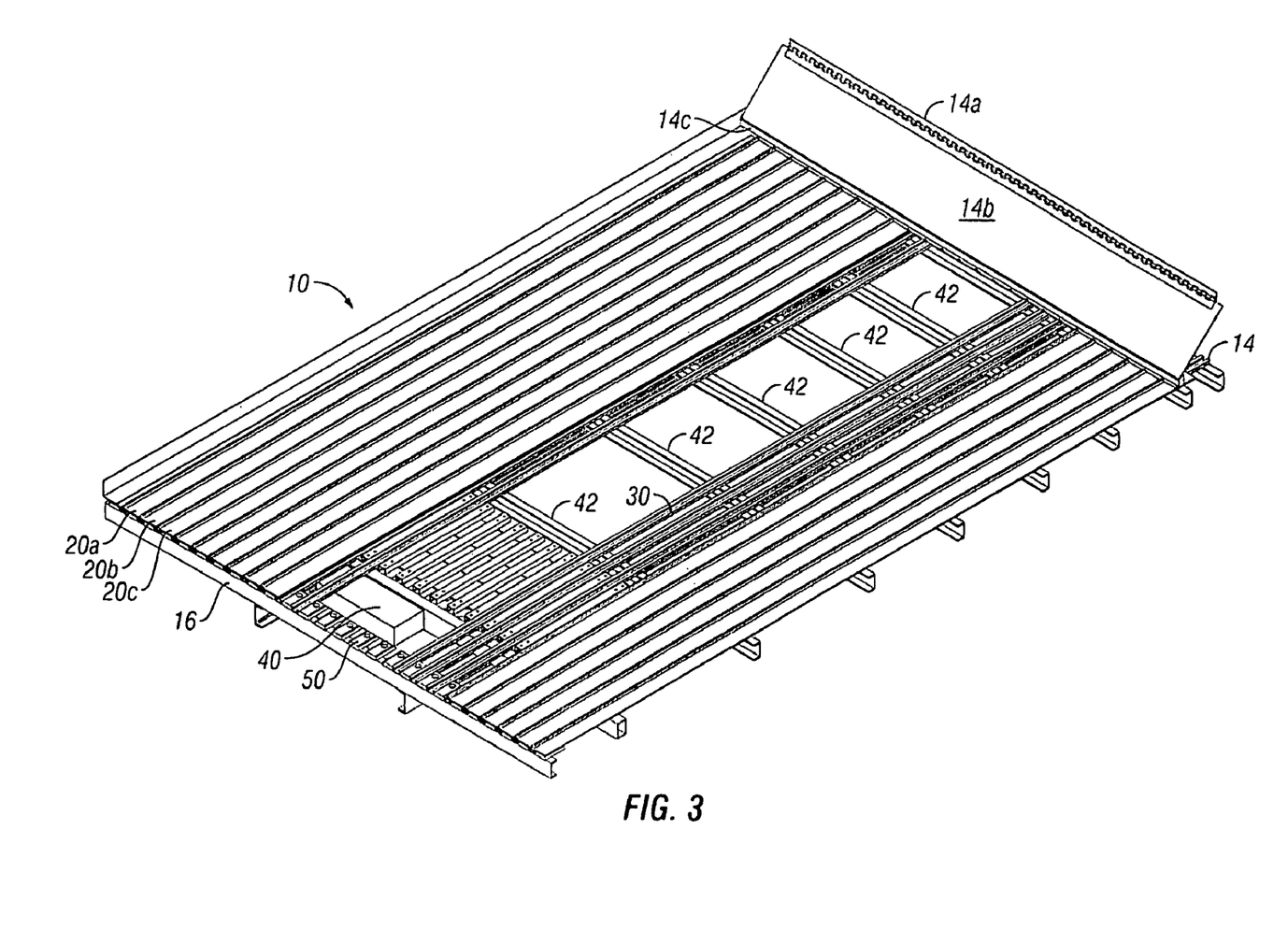
FIG. 3 is a perspective top view of a load-holding compartment of a load transport vehicle with a plurality of deck slats removed to show exemplary systems and structures of a hydraulically-powered conveyor system.
Figure 4:
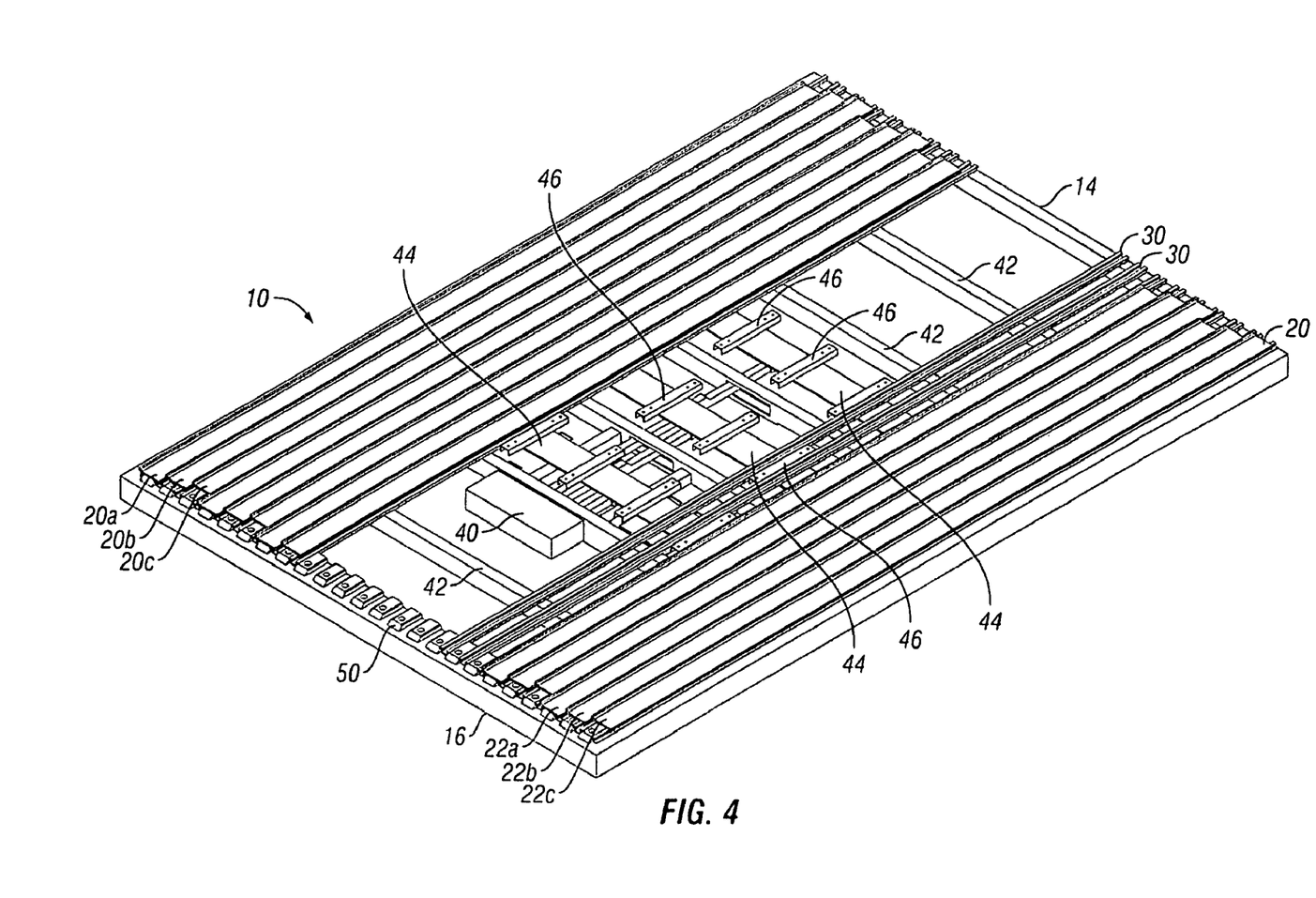
FIG. 4 is a perspective top view of a load-holding compartment of a load transport vehicle with a plurality of deck slats removed to show exemplary substructures of a reciprocating slat-type conveyor such as cross-drives and cross-drive shoes.
Figure 5:
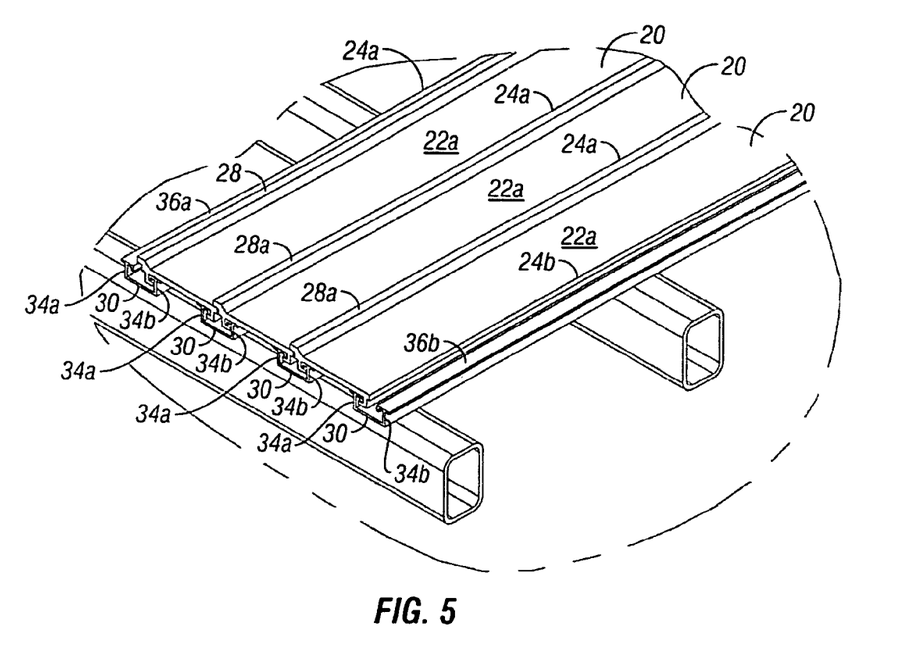
FIG. 5 is a perspective view of a section of the deck slats, subdecks, and exemplary substructure of a reciprocating slat-type conveyor of the present invention.

As shown in FIGS. 1-3, reciprocating slat-type conveyors 10 (also referred to as "conveyor systems," "live floor conveyors," "reciprocating slat conveyors," or "conveyors") generally include a plurality of elongated slats 20a, 20b, 20c (also referred to as "conveyor slats," "floor slats," or "deck slats" and referenced generally by reference number 20 in FIGS. 5-8). Conveyor systems 10 are generally used in the load-holding compartment 12 of load transport vehicles. Exemplary load-holding compartments 12 include a mobile cargo trailer, a bed of a truck (truck bed), a rear portion of a semi-trailer, a cargo container, a container portion of a van-truck, stationary bins, or any mobile or stationary load holder. The load-holding compartments 12 have a framework that has a longitudinal direction and a transverse direction perpendicular to the longitudinal direction. Although the longitudinal direction is generally longer than the transverse direction, these terms are not meant to be so limited. In FIGS. 3 and 4, the longitudinal direction is shown as extending from the front 14 (with the bulkhead 14a, the slope sheet 14b, and the slope sheet wiper 14c) to the rear 16. The slats 20 (also referred to as 20a, 20b, 20c) are arranged side-by-side to form the floor of the load-holding compartment 12 so that they extend parallel to the longitudinal direction of the framework of the load-holding compartment 12. The design, of the slats 20, including length, width, and thickness, depends upon factors including the dimensions of the floor, the construction material, and the application(s) for which the conveyor is to be used.

In one preferred embodiment, the slats 20 are arranged in groups of slats (a group generally includes at least three slats 20a, 20b, 20c, although it is to be understood that each group may include any desired number in excess of two). As shown in FIG. 1, the slats 20a, 20b, 20c move simultaneously in one direction (the "load-conveying direction"). Then, as shown in FIG. 2, one slat 20a of each group moves in the opposite direction (the "retraction direction"), followed by another slat 20b of each group, and so on until all the slats of the groups are retracted. In this embodiment, the slats 20 move together taking the load with them, and then the slats 20 return to their starting position, with every third slat 20a, 20b, 20c moving in unison. The stationary slats (those not currently returning) hold the load at least partially in place until the next cycle begins. This operation results in a step-wise advance (in the load-conveying direction) of particulate matter positioned on the floor that may be followed by partial retraction of the particulate matter on the floor. It should be noted that alternative embodiments of the present invention may use alternative slat sequences shown and described in any of the references that are incorporated-by-reference herein. (For example, some of the references describe sequences in which a majority of the slats may be moved simultaneously in the load-conveying direction while the remaining slats are moved in the opposite, retraction direction.) It should be noted that the present invention is not to be limited to embodiments using these specific slat sequences.

Exemplary embodiments of the present invention are hydraulically-powered conveyor systems such as that shown in FIG. 3. In this shown embodiment, a two-way, variable-speed, hydraulic power unit 40 moves the floor and allows for controlled loading, unloading, and precision metering. The size and location of the power unit 40 depends upon the application(s) of the conveyor system. Alternative embodiments of the present invention may be powered using power units and structures shown and described in any of the references that are incorporated-by-reference herein. It should be noted that the present invention is not to be limited to embodiments powered using these power units 40 and structures.

FIG. 4 is a perspective top view of a section of subdecks 30 and other exemplary substructures 42, 44, 46 used to support the slats or physically connect the power system (including the power unit 40) to the slats 20. The subdecks 30 will be discussed in detail herein. Other exemplary substructures shown in this figure includes cross-members 42, cross-drives 44, and cross-drive shoes 46. The cross-drive shoes 46 can also be considered to be part of the drive mechanism along with the power unit 40 and any structure (e.g. the cross-drives 44) connecting the cross-drive shoes 46 to the power unit 40. Alternative embodiments of the present invention may use alternative substructure and drive mechanisms such as that shown and described in any of the references that are incorporated-by-reference herein. It should be noted that the present invention is not to be limited to these embodiments of the substructure and drive mechanisms.

Deck Slats and Subdecks

As will be discussed in more detail, the present invention includes a plurality of laterally and substantially parallel longitudinal trough-like subdecks 30 that are in a spaced relation so as to define a longitudinal opening or space 31 between adjacent subdecks 30. A plurality of longitudinal slats 20 are adjacent to and parallel to each other and, in preferred embodiments, are overlapping. Each slat 20 centrally located within the load-holding compartment 12 (as opposed to those slats on the longitudinal edges of the load-holding compartment 12—e.g. in some embodiments there is one on the right edge and one on the left edge) are in a sliding relationship with two adjacent subdecks 30. The slats 20 substantially cover the longitudinal space 31 between the two adjacent subdecks 30. Each subdeck 30 centrally located within the load-holding compartment 12 (as opposed to those subdecks on the longitudinal edges of the load-holding compartment 12—e.g. in some embodiments there is one on the right edge and one on the left edge) longitudinally supports two adjacent slats 20. In preferred embodiments, there is a raised double-seal system protecting the channel formed by the trough-like subdecks 30. The first seal 48a is formed when the slat first longitudinal side edge of one slat is substantially coextensive and in sliding relationship with the slat second longitudinal side edge of an adjacent slat (e.g. by overlapping the slats 20). The second seal 48b is formed when upward side projections of the subdeck are substantially coextensive and in sliding relationship with the bottom surface of the slats supported by the upward side projections (e.g. between the slats 20 and the subdecks 30 such that the seal 48*b* is raised to be near the bottom surface of the slats 20).

FIGS. 5-8 show the deck slats 20, slat-supporting guide trough subdecks 30, and exemplary substructure (e.g. the cross-drive shoes 46) of a double-sealed, bearingless, reciprocating conveyor system 10 of the present invention. In preferred embodiments of the present invention, the deck slats 20 and subdecks 30 are made from dissimilar materials. This is one of the means by which the present invention is able to function without bearings between the deck slats 20 and subdecks 30. Either the slats 20 or the subdecks 30 may be constructed of a light-weight material that is not stiff enough to prevent buckling due to longitudinal forces and/or other forces. The other component is constructed from an adequately stiff material that is capable of preventing this buckling. In the preferred embodiments, the deck slats 20 are constructed of an anti-friction material such as Extruded High Density Polyethelene (EHDP), High-Density Polyethylene (HDPE), Polyethylene High-Density (PEND), synthetic thermoplastic resin (e.g. Teflon®, Delrin®, polyethylene), UHMW plastic (high molecular weight resinous material), or other suitable material having a low coefficient of friction that is known or yet to be developed. The slats 20 may be made using processes such as continuous or discontinuous extrusion, pultrusion, molding, and other processes known or yet to be developed. It should be noted that, in preferred embodiments, each slat 20 is an integrally formed single piece (e.g. the legs are integral with the rest of the slat). Hallco Industries, Inc. of Tillamook, Oreg. manufactures slats (Part No. 39-5023) that may be purchased individually or as a set. In the shown embodiments, the subdecks 30 are constructed of a strong, stiff material such as steel, aluminum, or other suitable material that is stiffer than the slat material and that creates a low friction joint with the slat, the material being known or yet to be developed. The subdecks 30 may be made using processes such as hot or cold roll forming, extrusion, or cold drawing, and other processes known or yet to be developed. It should be noted that, in preferred embodiments, each subdeck 30 is an integrally formed single piece (e.g. the upward projections and slat engagers are integral with the rest of the subdeck). The dimensions shown in the figures and described herein are meant to be exemplary and are not meant to limit the scope of the invention. Depending on the material used, the dimensions, and other relevant factors, a conveyor system 10 of the present invention may hold a maximum load of 15,000 pounds (6,810 kilograms) to 20,000 pounds (9,080 kilograms) and may have a maximum longitudinal length of 20 feet (6 meters) to 25 feet (7.6 meters).

Figure 6:
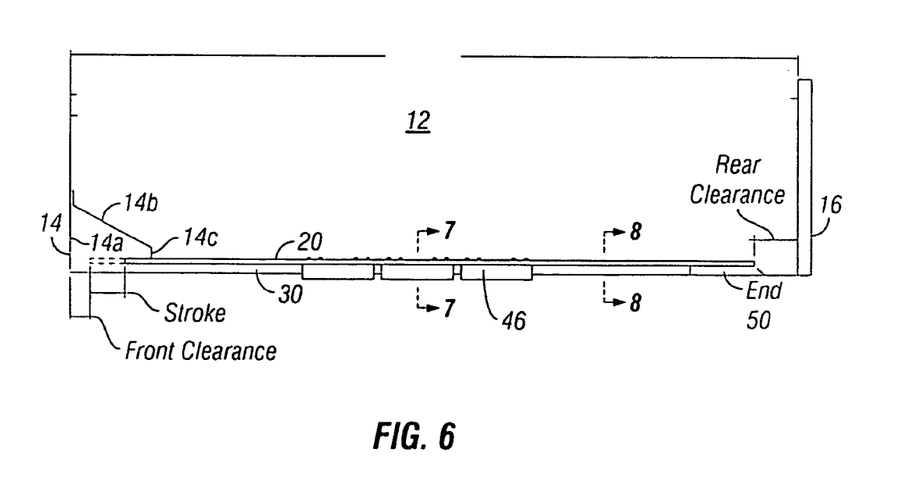
FIG. 6 is a longitudinal side cross-sectional view of a load-holding compartment of a load transport vehicle showing a deck slat, subdeck, and exemplary substructure of a reciprocating slat-type conveyor of the present invention.
Figure 7:
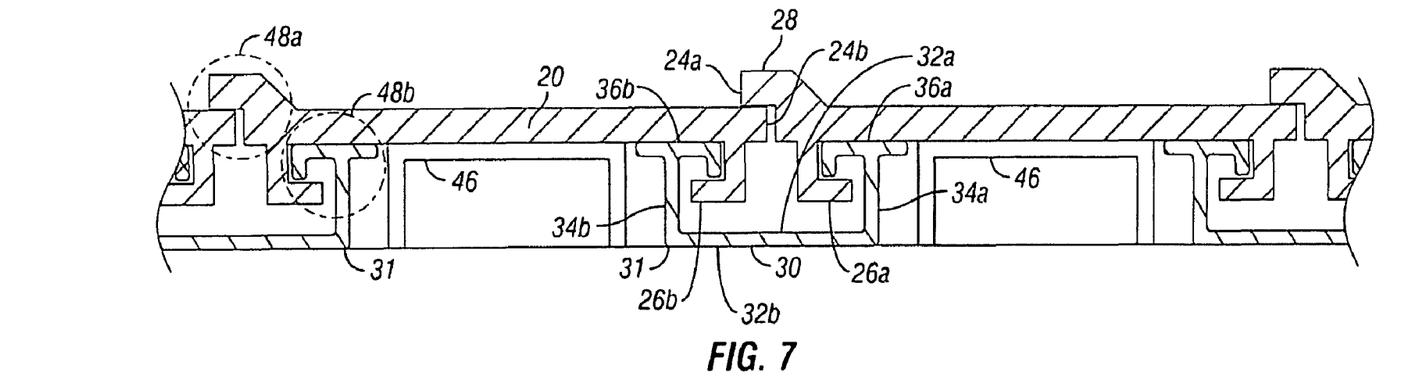
FIG. 7 is a cross-sectional view of a section of the floor including deck slats, subdecks, and cross-drive shoes of a reciprocating slat-type conveyor of the present invention taken along a section of the floor with cross-drive shoes.
Figure 8:
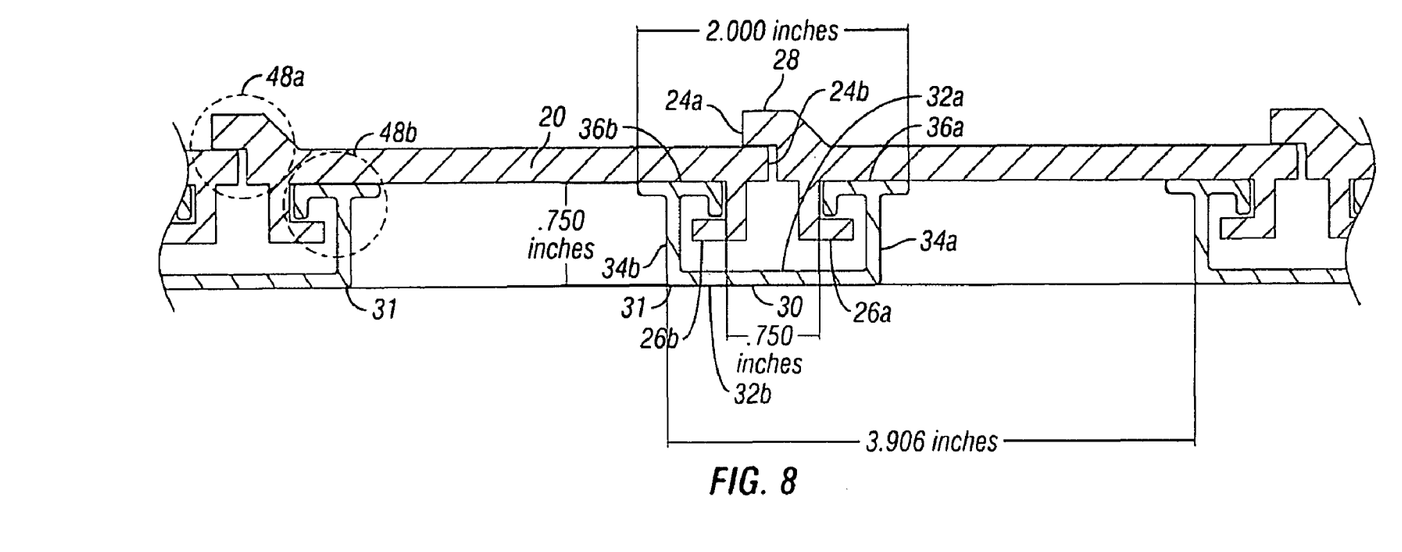
FIG. 8 is a cross-sectional view of a section of the floor including deck slats and subdecks of a reciprocating slat-type conveyor of the present invention taken along a section of the floor without cross-drive shoes.

FIGS. 7 and 8 show a preferred exemplary embodiment of the deck slats 20. The slats have a front end (positioned substantially near the front 14 of the load handling compartment 12, less a clearance), a rear end (positioned substantially near the rear 16 of the load handling compartment 12, less a clearance), a top surface 22*a* (also referred to as the upper load-bearing surface 22*a*), a bottom surface 22*b* (also referred to as the lower surface 22*b*), a first longitudinal side edge 24*a*, and a second longitudinal side edge 24*b*. Extending downward from the slat bottom surface 22*b* are a pair of legs 26*a*, 26*b*, one leg 26*a*, 26*b* at or near each side edge 24*a*, 24*b*. In the shown embodiment, the slat legs 26*a*, 26*b*, are inwardly directed L-shaped legs that will engage the subdeck 30. The slat side edges 24*a*, 24*b* are designed to be substantially coextensive and in sliding relationship with adjacent slat side edges 24*a*, 24*b* such as by overlapping or using a shiplap-type configuration. In the shown embodiment of FIGS. 1-8, there is a raised sealing longitudinal projection 28 extending along, but slightly above, the first longitudinal side edge 24*a* of each slat 20. The raised sealing longitudinal projection 28 has a bottom surface that engages (mates with and provides a substantial seal thereto) the slat top surface 22*a* of the adjacent slat second longitudinal side edge 24*b* to form the seal 48*a*. If, as shown, the legs 26*a*, 26*b* are slightly inward from their respective side edges 24*a*, 24*b*, the slat 20 has outwardly extending protrusions beyond the legs 26*a*, 26*b*. In the shown embodiment, the raised sealing longitudinal projection 28 is mounted on or integral with the outwardly extending protrusion on the first longitudinal side edge 24*a* of each slat and the bottom surface of the longitudinal projection 28 engages the slat top surface 22*a* of the outwardly extending protrusion on the adjacent slat second longitudinal side edge 24*b*. The seal 48*a* formed by the overlapping slats 20 prevents debris and particulate matter from escaping the conveyor system 10 by providing floor-length protection. Because these slat surfaces have a low friction coefficient, the slats 20 are able to move relative to each other.

FIGS. 7 and 8 show a preferred exemplary embodiment of the slat-supporting guide trough subdecks 30. This adjective-laden term is meant to highlight several features of the subdecks 30. First, the subdecks 30 support the slats 20 longitudinally along their longitudinal edges 24*a*, 24*b*. Second, the subdecks 30 act as a guide or guide beam that conducts the movement of the slats 20. Third, the subdecks 30 are shaped at least partially like a longitudinal trough or channel (substantially U-shaped with a base and two upwardly extending projections) that is able to catch and contain any debris and particulate matter that passes through the overlapping slats 20 from escaping the conveyor system 10. The subdecks have a front end (positioned substantially near the front 14 of the load handling compartment 12, less a clearance), a rear end (positioned substantially near the rear 16 of the load handling compartment 12, less a clearance), an interior surface 32*a*, an exterior surface 32*b*, a first longitudinal side edge 34*a* (also referred to as the first upward side projection 34*a*), and a second longitudinal side edge 34*b* (also referred to as the second upward side projection 34*b*). In the preferred embodiment, the top of the upward side projections 34*a*, 34*b* are slat engagers 36*a*, 36*b*. In the shown embodiment, the slat engagers 36*a*, 36*b* and the upward side projections 34*a*, 34*b* together form a substantially T-shape upward projection from the base. It should be noted that the slat engagers 36*a*, 36*b* may have an alternative shape and they may be part of and/or integral with the upward side projections 34*a*, 34*b*. The top surfaces of the slat engagers 36*a*, 36*b* engage the bottom surface 22*b* of the slats 20. The inwardly projecting portions (the part towards the interior of the subdeck) of the slat engagers 36*a*, 36*b* engage the slat legs 26*a*, 26*b*. As shown, this configuration would substantially prevent vertical (up-down) movement between the slats 20 and their supporting subdecks 30, but would allow substantially free longitudinal movement (sliding contact) between the slats 20 and their supporting subdecks 30. The shapes of these features also help to keep load particulate matter from getting into the sliding joints between the slats 20 and the subdecks 30. If there is enough load contained in the channel to lift the slats enough to allow particulate matter into the sliding joint, the slat legs 26*a*, 26*b* (the "L-shaped portion) makes contact with the lower surface of the subdeck slat engagers 36*a*, 36*b* and thus creates a stronger seal 48*b* to prevent the passage of the load matter. Because the surfaces of the slats 20 have a low friction coefficient and because the materials from which the slats 20 and the subdecks 30 are constructed are dissimilar, there is no need for a bearing therebetween.

In preferred embodiments, as shown in FIGS. 1 and 6, end caps 50 may be positioned and secured at the ends of the subdecks 30 near the rear 16 of the load handling compartment 12. The end caps 50 plug the hole between the subdeck and the rear sill of the container (FIG. 4) to prevent load from escaping. A similar arrangement could be placed at the front end 14 for a really secure container although the wiper 14c and slope sheet 14b are designed to prevent load from entering the front portion of the deck.

FIGS. 9-13 show alternative preferred embodiments of the slats and subdecks. These embodiments share many of the characteristics of the preferred embodiment shown in FIGS. 1-8. Another alternative preferred embodiment would contain slats that have longitudinal edges with a true shiplap design. It should be noted that these alternative preferred embodiments may include additional patentable features.

Figure 9:
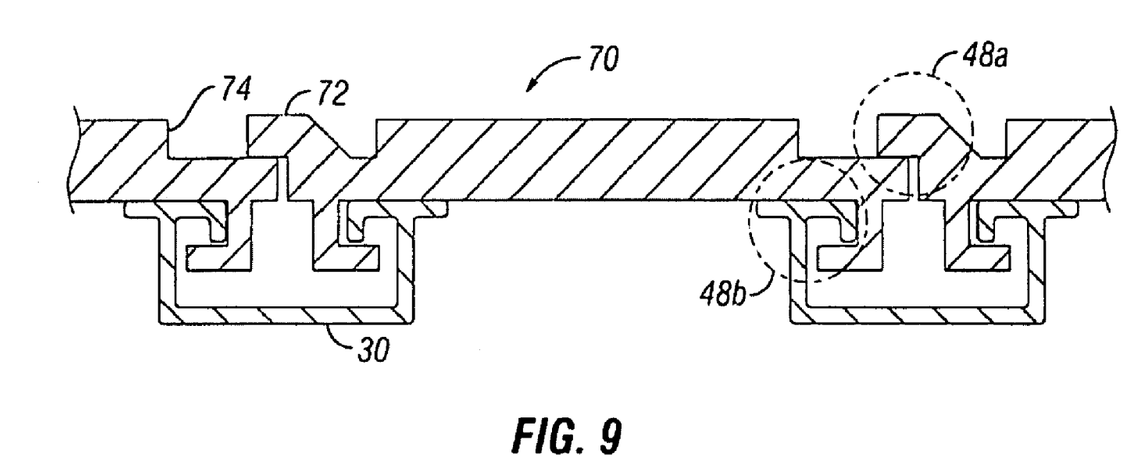
FIG. 9 is a cross-sectional view of a section of an alternative preferred embodiment of a floor including first alternative deck slats and subdecks of a reciprocating slat-type conveyor of the present invention taken along a section of the floor without cross-drive shoes.

FIG. 9 shows an alternative slat 70 embodiment with a sealing longitudinal projection 72 at or near the slat first longitudinal side edge and with a longitudinal notch 74 near the slat second longitudinal side edge. The sealing longitudinal projection 72 is substantially level with the top surface of the slat 70. Sealing longitudinal projections 72 mate with respective longitudinal notches 74 of adjacent slats 70 to form a substantial seal therewith. The resulting connection between the sealing longitudinal projections 72 and adjacent longitudinal notches 74 has no surfaces higher than the top surface of the slat 70.

Figure 10:
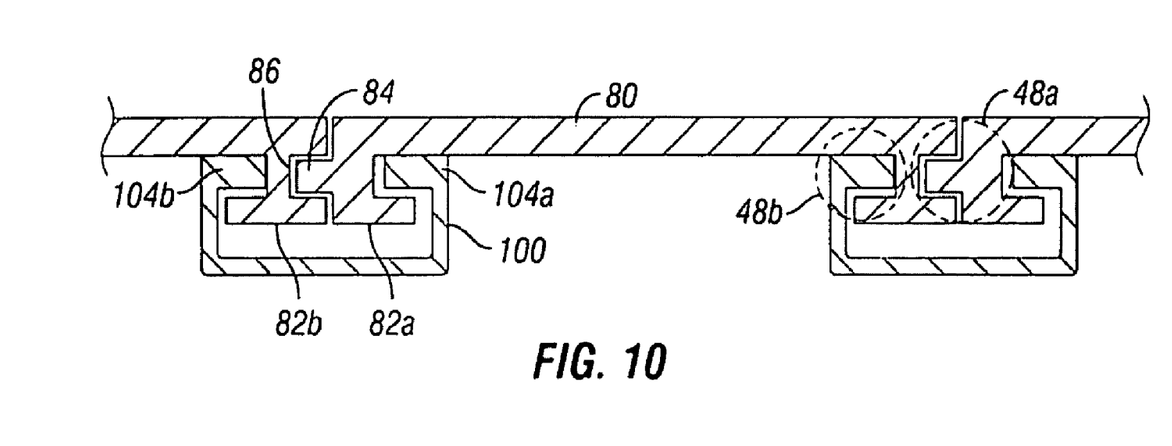
FIG. 10 is a cross-sectional view of a section of an alternative preferred embodiment of a floor including second alternative deck slats and alternative subdecks of a reciprocating slat-type conveyor of the present invention taken along a section of the floor without cross-drive shoes.

FIG. 10 shows an alternative slat 80 embodiment with inwardly directed longitudinal L-shaped legs 82a, 82b at the slat longitudinal side edges of the slat 80. The first L-shaped leg 82a has a sealing longitudinal projection 84 extending substantially perpendicular thereto. The second L-shaped leg 82b has a notch 86 defined therein designed to mate with the sealing longitudinal projection 84. Sealing longitudinal projections 84 mate with respective longitudinal notches 86 of adjacent slats 80 to form a substantial seal therewith. The resulting connection between the sealing longitudinal projections 84 and adjacent longitudinal notches 86 makes the floor formed from the top surfaces of the slats 80 substantially flat.

Figure 11:
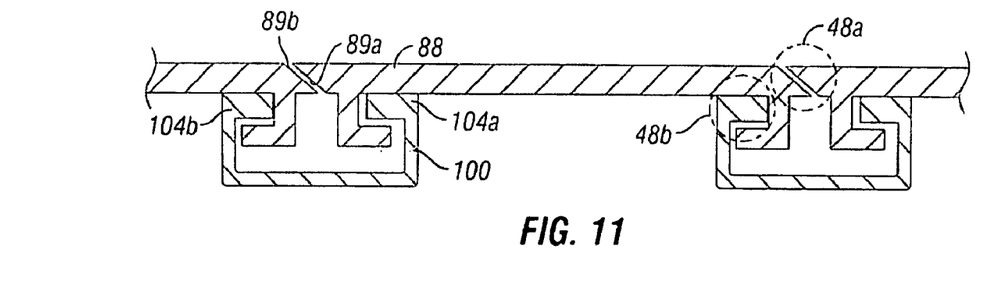
FIG. 11 is a cross-sectional view of a section of an alternative preferred embodiment of a floor including third alternative deck slats and alternative subdecks of a reciprocating slat-type conveyor of the present invention taken along a section of the floor without cross-drive shoes.

FIG. 11 shows an alternative slat 88 embodiment in which the slat longitudinal side edges 89a, 89b are angled or otherwise formed to be in mating relationship. The resulting connection between the longitudinal side edges 89a, 89b makes the floor formed from the top surfaces of the slats 88 substantially flat.

Figure 12:
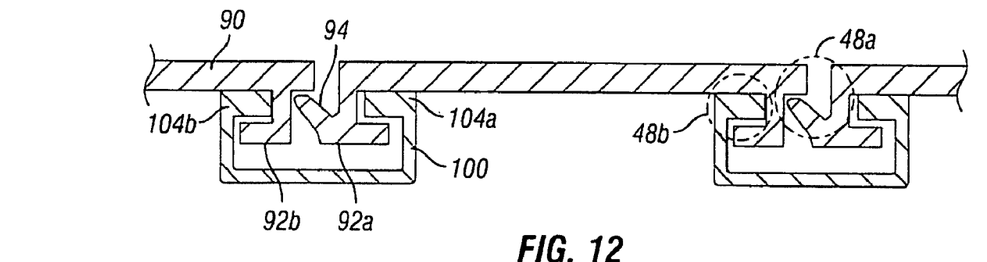
FIG. 12 is a cross-sectional view of a section of an alternative preferred embodiment of a floor including fourth alternative deck slats and alternative subdecks of a reciprocating slat-type conveyor of the present invention taken along a section of the floor without cross-drive shoes.

FIG. 12 shows an alternative slat 90 embodiment with inwardly directed longitudinal L-shaped legs 92a, 92b near the slat longitudinal side edges of the slat 90. The first L-shaped leg 92a has an upwardly-angled sealing longitudinal projection 94 therefrom. In this shown embodiment, the upwardly-angled sealing longitudinal projection 94 mates with the intersection of the top of the slat 90 and the second L-shaped leg 92b. Sealing longitudinal projections 94 mate with respective longitudinal notches 96 of adjacent slats 90 to form a substantial seal therewith. The resulting connection between the sealing longitudinal projections 94 and adjacent longitudinal notches 96 makes the floor formed from the top surfaces of the slats 90 substantially flat.

Figure 13:
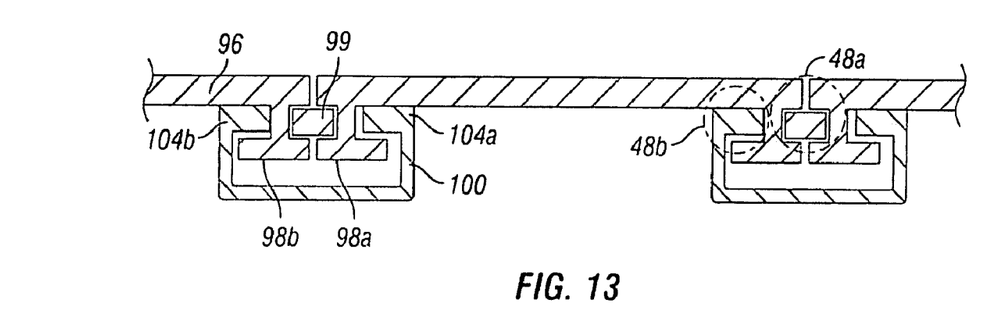
FIG. 13 is a cross-sectional view of a section of an alternative preferred embodiment of a floor including fifth alternative deck slats and alternative subdecks of a reciprocating slat-type conveyor of the present invention taken along a section of the floor without cross-drive shoes.

FIG. 13 shows an alternative slat 96 embodiment with inwardly directed longitudinal upside-down T-shaped legs 98a, 98b near the slat longitudinal side edges of the slat 96. In this embodiment, rather than using an integral longitudinal projection, a distinct longitudinal sealing member 99 (shown as a solid bar) is used. In this shown embodiment, the longitudinal sealing member 99 mates with the outwardly directed portions of the T-shaped legs 98a, 98b to form a substantial seal therewith. The resulting connection between the longitudinal sealing member 99 and the outwardly directed portions of the T-shaped legs 98a, 98b makes the floor formed from the top surfaces of the slats 96 substantially flat.

FIGS. 10-13 also show an alternative preferred embodiment of the subdeck 100. Like the subdecks 30, alternative subdecks 100 have a front end (positioned substantially near the front 14 of the load handling compartment 12, less a clearance), a rear end (positioned substantially near the rear 16 of the load handling compartment 12, less a clearance), an interior surface, and an exterior surface. The first longitudinal side edge 104a (also referred to as the first upward side projection 104a) and the second longitudinal side edge 104b (also referred to as the second upward side projection 104b) are preferably upside-down, inwardly-directed L-shaped members. As shown, the "L" of the side projections 104a, 104b engages the bottom surface of the slats.

Advantages and Features of the Present Invention

The simple and elegant use of materials and design in the present invention belies the revolutionary nature of the present invention. Although reciprocating conveyors have been produced since at least 1970, they continue to have problems such as those described in the Background of this specification. Although various known reciprocating conveyors solve some of the problems, most continue to have at least some of the problems. Also, sometimes the solutions result in additional complexity, expense, weight, installation time, and/or other undesired consequences. The present invention is a complete redesign of conveyor systems (particularly the slats and subdecks) that solves many of the problems of known reciprocating conveyors and, additionally, reduces complexity, expense, weight, and installation time. This section addresses some of the advantages and features of preferred embodiments of the present invention.

Preferred embodiments of the conveyor system 10 substantially reduce the complexity as compared to prior art conveyor systems. Prior art conveyor systems have at least three (and usually more) primary components as compared to the present invention that includes just two primary components—deck slats 20 and subdecks 30. One reason this is possible is because the deck slats 20 and subdecks 30 are made from dissimilar materials which eliminates the need for distinct bearing components between the subdecks 30 and the moving deck slats 20. Another reason that this is possible is because in the preferred embodiments the slats 20 are formed of a material that is inherently friction reducing. The design of the deck slats 20 and subdecks 30 such that sealing mechanisms are integral therewith also reduces the complexity of the system, production costs, weight, and installation time because less components are needed. For example, in most of the preferred embodiments (except for the embodiment shown in FIG. 13), the sealing projections are integral with the slats. Another example is that a seal is formed between the slats 20 and subdecks 30. Finally, the multiple-function design and arrangement of the subdecks 30 and slats 20 eliminates the need for additional components. Separate central support components are not needed because the subdecks 30 support the slats 20 longitudinally along their longitudinal edges 24a, 24b. Separate guide components are not needed because the subdecks 30 act as a guide or guide beam that conducts the movement of the slats 20. Separate containment troughs are not needed because the subdecks 30 function as a longitudinal trough or channel. Elimination of separate components reduces the complexity of the system, production costs, weight, and/or installation time.

Preferred embodiments of the present invention reduce or eliminate leakage between the slats 20 and the subdecks 30 for security and cleanliness. Leakage out of the conveyor system 10 is extremely undesirable for shredded confidential documents as well as other loads. Leakage into the conveyor system (e.g. road contaminants) is also extremely undesirable for certain types of loads (e.g. grains and other foodstuff). One way that this is accomplished is the use of the longitudinal trough-like containment subdecks 30 positioned between longitudinal side edges 24a, 24b of adjacent slats 20 so as to catch the fine particulate matter that sifts between the moving slats 20 and prevent it from escaping the conveyor 10. Another way that this is accomplished is the use of a double-seal system 48a, 48b. The first seal 48a is the overlapping of adjacent slat side edges 24a, 24b (accomplished in some preferred embodiments using, for example, the raised sealing longitudinal projection 28). This first seal 48a substantially prevents communication of fine particulate matter or other contaminates between the load-holding compartment and the trough-like containment subdecks 30. The second seal 48b is the seal formed between the longitudinal edges of the slats and the longitudinal edges of the subdecks. Significantly, this second seal 48b is not at the bottom of the trough-like containment subdecks 30, but is raised to make it more difficult to breach. This second seal can be a "maze" through which it would be difficult for matter travel. In the shown exemplary preferred embodiments, at least part of this second seal 48b is formed when the top surfaces of the slat engagers 36a, 36b are in substantially coextensive and sliding relationship with the bottom surface 22b of the slats 20. In the shown exemplary preferred embodiments, at least part of this second seal 48b is formed when the slat engagers 36a, 36b are in substantially coextensive and sliding relationship with the slat legs 26a, 26b. As mentioned above, the strength of this second seal is enhanced if the channel fills because the load particulate matter lifts the slats so that the slat legs 26a, 26b (the "L-shaped portion) makes a stronger contact with the lower surface of the subdeck slat engagers 36a, 36b. Both the first and second seals are accomplished without adding components or otherwise compromising the simplicity of the present invention.

Preferred embodiments of the conveyor system 10 also have a reduced installed weight because the floor can be constructed of light-weight materials. The deck weight reduction may be as significant as half the weight of comparable decks formed from aluminum slats. Normally, light-weight material would buckle due to longitudinal forces and/or other forces so using light-weight material is not a simple substitution, but required a complete redesign. In preferred embodiments the subdecks 30 and the deck slats 20 have been redesigned so that light-weight material is closely engaged and longitudinally side-supported by adequately stiff material to prevent buckling. In the shown embodiments, the slat 20 and subdeck 30 design provides the weak slats 20 with improved support against buckling.

Still another example is that in preferred embodiments the slats 20 and subdecks 30 are designed so that the slats 20 are supported near their longitudinal edges by the parallel spaced subdecks 30 such that the center of each slat 20 has a longitudinal opening 31 (the span between the subdecks 30) into which the drive mechanism (e.g. the cross-drive shoe 46) can be placed. This enables both the subdecks 30 and the slats 20 to be continuous from the front of the load-holding compartment to the back of the load-holding compartment. This has the effect of increasing strength and decreasing installation time.

Preferred embodiments of the conveyor system 10 also increase the vertical and lateral strength of the floor as compared to prior art conveyor systems. Preferred embodiments of the conveyor system 10 of the present invention include the feature of lower operation pressures (because there is less friction when cycling). Preferred embodiments of the conveyor system 10 of the present invention include the feature of tighter end seals (as compared to the end seals of aluminum slats). The ends of the slats and subdecks shown in known references are difficult to seal because the open gap is also the joint between two adjacent slats. The present invention allows this difficult area to be open since it is contained by the trough-like subdeck. The open ends of the slats are now easier to seal because they are bounded only by the lower surface of the slat and the outside walls of adjacent subdecks.

It should be noted that because the subdecks 30 support the slats 20, no additional support is needed to support the slats even though preferred embodiments are made from light weight material. This can be compared to U.S. Pat. No. 4,727,978 which requires additional structures such as tubular support members to support the slats. Another advantage over this reference includes that no bearings are needed for the present invention. Finally, because the slat engagers 36a, 36b of the subdecks 30 engage (form an additional seal) the slat legs 26a, 26b of the slats 20, vertical movement between the subdecks 30 and slats 20 is substantially reduced or eliminated. Also, because this "seal" (between the subdeck slat engagers 36a, 36b and the slat legs 26a, 26b) is raised, it would be more difficult for particulate matter to escape than the lower connection between the slats and trough in U.S. Pat. No. 4,727,978.

It should also be noted that, although preferred embodiments of the subdecks 30 are able to catch and contain debris and particulate matter, the overlapping slats 20 prevents the majority of debris and particulate matter from entering the channels of the subdecks 30. This is significant because it avoids problems associated with designs that encourage matter to enter the channels (e.g. U.S. Pat. No. 4,611,708).

Method of Installation:

An exemplary conveyor system 10 of the present invention may be installed using an exemplary basic installation method, the steps of which would be modified based on variables including, but not limited to materials, sizes, locations, and intended applications. The figures of this application, particularly FIG. 6, are useful in understanding this method. First, the drive mechanisms (e.g. the cross-drives, cross-drive shoes, and the power units) are installed in, below, or otherwise near the load-holding compartment 12. Before the subdecks 30 are installed, both the number of moving slats 20 (as opposed to stationary side trim slats) and the clearances (e.g. front and rear clearances) should be determined and planned. If the number of moving slats 20 is even (even deck number), an odd number of subdecks 30 are used with one subdeck 30 centered on and anchored to the load-holding compartment 12 centerline. If the number of moving slats 20 is odd (odd deck number), an even number of subdecks 30 are used with two subdecks 30 centered about and anchored to the load-holding compartment 12 centerline. A spacer jig can be used to position the remaining subdecks 30. End caps 50 are positioned and secured at the ends of the subdecks 30 as shown (e.g. between two subdecks). Next, the deck slats 20 can be installed onto the subdecks 30 by sliding the slats 20 onto the subdecks 30 from the end. When everything is in the correct position, the slats 20 may be secured to their respective cross-drive shoes 46. Side trim made from a whole or a partial (ripped) deck slat 20 may be added at this point. Also, a sloped sheet with a wiper may be added at this point.

The term "seal," as used in the present invention, is not generally meant to mean a complete and absolute barrier. Instead, the term "seal" is meant to mean an intended and substantial barrier to entry. Accordingly, it is possible that some matter will pass the first seal 48a and enter the channel formed by the subdeck 30. Depending on the tolerances and the type of material, the seal may be almost complete.

It should be noted that some terms used in this specification are meant to be relative. For example, the terms "longitudinal" and "transverse" are meant to be relative and, if the system was rotated, the terms would change accordingly. Similarly, the term "front" is meant to be relative to the term "rear" and the term "top" is meant to be relative to the term "bottom." It should be noted that, unless otherwise specified, the term "or" is used in its nonexclusive form.

All the references cited herein are incorporated by reference.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A reciprocating slat conveyor for use in a load-holding compartment, said reciprocating conveyor comprising:
   (a) a plurality of laterally and substantially parallel longitudinal trough-like subdecks made of a first material, said subdecks in a spaced relationship so as to form a longitudinal space between adjacent subdecks;
   (b) a plurality of longitudinal slats adjacent to and parallel to each other, said slats made of a second material dissimilar to said first material, each slat having a slat top surface, a slat bottom surface, a slat first longitudinal side edge, and a slat second longitudinal side edge;
   (c) each slat centrally located within said load-holding compartment in a sliding relationship with a pair of adjacent subdecks and covers the longitudinal space between said pair of adjacent subdecks, said pair of adjacent subdecks conducting the movement of said slat; and
   (d) each subdeck centrally located within said load-holding compartment longitudinally supporting two adjacent slats at or near a slat longitudinal side edge;
   (e) wherein each subdeck has a base and two upwardly extending projections, said longitudinal slats supported above said base such that said longitudinal slats are remote from said base.

2. The reciprocating slat conveyor of claim 1 wherein said first material is stiffer than said second material.

3. The reciprocating slat conveyor of claim 1 wherein said conveyor is free from distinct bearing elements between said subdecks and said slats.

4. The reciprocating slat conveyor of claim 1 wherein said slat first longitudinal side edge of one slat forms a first seal with and is in sliding relationship with said slat second longitudinal side edge of an adjacent slat.

5. The reciprocating slat conveyor of claim 1 wherein said slat first longitudinal side edge of one slat overlaps with said slat second longitudinal side edge of an adjacent slat.

6. The reciprocating slat conveyor of claim 1, further comprising a raised double-seal system comprising first seals and second seals:
   (a) said first seals formed when said slat first longitudinal side edge of one slat is substantially coextensive and in sliding relationship with said slat second longitudinal side edge of an adjacent slat; and
   (b) said second seals formed when upward side projections of said subdeck are substantially coextensive and in sliding relationship with the slat bottom surface of the slats supported by said upward side projections.

7. The reciprocating slat conveyor of claim 1, further comprising:
   (a) each longitudinal trough-like subdeck having a subdeck first upward side projection with a first slat engager thereon and a subdeck second upward side projection with a second slat engager thereon;
   (b) said first slat engager engaging said slat bottom surface at or near said slat first longitudinal side edge; and
   (c) said second slat engager engaging said slat bottom surface at or near said slat second longitudinal side edge.

8. The reciprocating slat conveyor of claim 1, further comprising drive mechanisms, said drive mechanisms positioned in longitudinal spaces between adjacent subdecks.

9. The reciprocating slat conveyor of claim 1 wherein each subdeck has a substantially consistent cross-section along the length of said subdeck.

10. The reciprocating slat conveyor of claim 1, each longitudinal slat having a longitudinal middle span corresponding to longitudinal spaces between adjacent subdecks, said longitudinal middle span being unsupported by said subdecks, said longitudinal middle span being more than 30% of the width of said longitudinal slat.

11. A reciprocating slat conveyor for use in a load-holding compartment, said reciprocating conveyor comprising:
   (a) a plurality of laterally and substantially parallel longitudinal trough-like subdecks made of a first material, said subdecks in a spaced relationship so as to form a longitudinal space between adjacent subdecks;
   (b) a plurality of longitudinal slats adjacent to and parallel to each other, said slats made of a second material dissimilar to said first material, each slat having a slat to surface, a slat bottom surface, a slat first longitudinal side edge, and a slat second longitudinal side edge;
   (c) each slat centrally located within said load-holding compartment in a sliding relationship with a pair of adjacent subdecks and covers the longitudinal space between said pair of adjacent subdecks, said pair of adjacent subdecks conducting the movement of said slat;
   (d) each subdeck centrally located within said load-holding compartment longitudinally supporting two adjacent slats at or near a slat longitudinal side edge;
   (f) each longitudinal trough-like subdeck having a subdeck first upward side projection with a first slat engager thereon and a subdeck second upward side projection with a second slat engager thereon;
   (g) each slat having a downwardly extending pair of legs including a first leg at or near said slat first longitudinal side edge and a second leg at or near said slat second longitudinal side edge;
   (h) said first slat engager engaging said slat first leg; and
   (i) said second slat engager engaging said second leg.

12. A reciprocating slat conveyor for use in a load-holding compartment, said reciprocating conveyor comprising:
   (a) a plurality of laterally and substantially parallel longitudinal trough-like subdecks, said subdecks in a spaced relationship so as to form a longitudinal space between adjacent subdecks;
   (b) a plurality of longitudinal slats adjacent to and parallel to each other, each slat having a slat top surface, a slat bottom surface, a slat first longitudinal side edge, and a slat second longitudinal side edge;
   (c) each slat centrally located within said load-holding compartment in a sliding relationship with a pair of adjacent subdecks and covers the longitudinal space between said pair of adjacent subdecks, said pair of adjacent subdecks conducting the movement of said slat;

(d) each subdeck centrally located within said load-holding compartment longitudinally supporting two adjacent slats at or near a slat longitudinal side edge; and (e) a raised double-seal system comprising first seals and second seals:

(i) said first seals formed when said slat first longitudinal side edge of one slat is substantially coextensive and in sliding relationship with said slat second longitudinal side edge of an adjacent slat; and (ii) said second seals formed when upward side projections of said subdeck are substantially coextensive and in sliding relationship with the slat bottom surface of the slats supported by said upward side projections (f) wherein each subdeck has a base and two upwardly extending projections, said longitudinal slats supported above said base such that said longitudinal slats are remote from said base.

13. The reciprocating slat conveyor of claim 12 wherein said subdecks are made of a first material and said slats are made of a second material dissimilar to said first material, said first material being stiffer than said second material.

14. The reciprocating slat conveyor of claim 12 wherein said conveyor is free from distinct bearing elements between said subdecks and said slats.

15. The reciprocating slat conveyor of claim 12, further comprising:

(a) each upward side projection having a slat engager thereon; and (b) each slat engager engaging said slat bottom surface at or near one of said slat longitudinal side edges.

16. The reciprocating slat conveyor of claim 12, further comprising:

(a) wherein said upward side projections are a subdeck first upward side projection and a subdeck second upward side projection, said subdeck first upward side projection having an associated first slat engager, said subdeck second upward side projection having an associated second slat engager;

(b) each slat having a downwardly extending pair of legs including a first leg at or near said slat first longitudinal side edge and a second to leg at or near said slat second longitudinal side edge;

(c) said first slat engager engaging said slat first leg; and (d) said second slat engager engaging said second leg.

17. The reciprocating slat conveyor of claim 12 wherein each subdeck has a substantially consistent cross-section along the length of said subdeck.

18. The reciprocating slat conveyor of claim 12, each longitudinal slat having a longitudinal middle span corresponding to longitudinal spaces between adjacent subdecks, said longitudinal middle span being unsupported by said subdecks, said longitudinal middle span being more than 30% of the width of said longitudinal slat.

19. A reciprocating slat conveyor for use in a load-holding compartment, said reciprocating conveyor comprising:

(a) a plurality of laterally and substantially parallel longitudinal trough-like subdecks, said subdecks in a spaced relationship so as to form a longitudinal space between adjacent subdecks, each subdeck having a subdeck first upward side projection with a first slat engager thereon and a subdeck second upward side projection with a second slat engager thereon;

(b) a plurality of longitudinal slats adjacent to and parallel to each other, each slat having a slat top surface, a slat bottom surface, a slat first longitudinal side edge, and a slat second longitudinal side edge, each slat having a downwardly extending pair of legs including a first leg at or near said slat first longitudinal side edge and a second leg at or near said slat second longitudinal side edge;

(c) each slat centrally located within said load-holding compartment in a sliding relationship with a pair of adjacent subdecks and covers the longitudinal space between said pair of adjacent subdecks, said pair of adjacent subdecks conducting the movement of said slat;

(d) each subdeck centrally located within said load-holding compartment longitudinally supporting two adjacent slats at or near a slat longitudinal side edge;

(e) said first slat engager engaging said slat bottom surface and said slat first leg; and (f) said second slat engager engaging said slat bottom surface and said second leg;

(g) wherein each subdeck has a base and two upwardly extending projections, said longitudinal slats supported above said base such that said longitudinal slats are remote from said base.

20. The reciprocating slat conveyor of claim 19 wherein said slat first longitudinal side edge of one slat forms a first seal with and is in sliding relationship with said slat second longitudinal side edge of an adjacent slat.

21. The reciprocating slat conveyor of claim 19 further comprising a raised double-seal system comprising first seals and second seals:

(a) said first seals formed when said slat first longitudinal side edge of one slat is substantially coextensive and in sliding relationship with said slat second longitudinal side edge of an adjacent slat; and (b) said second seals formed when said slat engagers are substantially coextensive and in sliding relationship with the slat bottom surface of the slats supported by said upward side projections.

22. The reciprocating slat conveyor of claim 19, said first slat engager engaging said slat bottom surface at or near said slat first longitudinal side edge, and said second slat engager engaging said slat bottom surface at or near said slat second longitudinal side edge.

23. The reciprocating slat conveyor of claim 19 wherein said subdecks are made of a first material and said slats made of a second material dissimilar to said first material, said first material being stiffer than said second material.

24. The reciprocating slat conveyor of claim 19 wherein said conveyor is free from distinct bearing elements between said subdecks and said slats.

25. The reciprocating slat conveyor of claim 19 wherein each subdeck has a substantially consistent cross-section along the length of said subdeck.

26. The reciprocating slat conveyor of claim 19, each longitudinal slat having a longitudinal middle span corresponding to longitudinal spaces between adjacent subdecks, said longitudinal middle span being unsupported by said subdecks, said longitudinal middle span being more than 30% of the width of said longitudinal slat.

* * * * *

UNITED STATES PATENT AND TRADEMARK OFFICE
CERTIFICATE OF CORRECTION

PATENT NO. : 7,926,646 B1  
APPLICATION NO. : 12/332335  
DATED : April 19, 2011  
INVENTOR(S) : Timothy M. Berthelsen, Brady L. Byers and Gregory P. Danis Page 1 of 1

It is certified that error appears in the above-identified patent and that said Letters Patent is hereby corrected as shown below:

Column 3  
Line 35, "slat-type conveyor," should read --slat-type conveyors,--.  
Lines 59-60, "embodiments the" should read --embodiments, the--.

Column 5  
Line 45, "The design, of the slats" should read --The design of the slats--.

Column 7  
Line 19, "(PEND)" should read --(PHND)--.  
Line 29, "Oreg." should read --Oregon--.

Column 8  
Line 59 "(the "L-shaped portion)" should read --(the "L-shaped portion")--.

Column 11  
Line 35 "(the "L-shaped portion)" should read --(the "L-shaped portion")--.

Column 14  
Lines 33-34, "to surface," should read --top surface--.  
Lines 45-54, subsection (e) is skipped and therefore subsections (f)-(i) are mislabelled. Please change subsection (f) to (e), (g) to (f), (h) to (g), and (i) to (h).

Column 15  
Line 44, "and a second to leg" should read --and a second leg--.

Signed and Sealed this  
Tenth Day of January, 2012

David J. Kappos  
*Director of the United States Patent and Trademark Office*